United States Patent [19]

Choi et al.

[11] Patent Number: 4,882,665

[45] Date of Patent: Nov. 21, 1989

[54] HIGH FREQUENCY, HIGH POWER, POWER SUPPLY

[76] Inventors: Keh-Kun Choi, 60-100 H01-K1-Dong, Tongdaemun-Gu Seoul, 131, Rep. of Korea; Hyeong I. Choi, 5431 NE. River Rd., Chicago, Ill. 60656

[21] Appl. No.: 205,236

[22] Filed: Jun. 10, 1988

[51] Int. Cl.⁴ .............................................. H02M 7/00
[52] U.S. Cl. .......................................... 363/60; 320/1; 307/110
[58] Field of Search ..................... 363/59–61, 363/159, 160, 164, 173; 320/1; 307/110

[56] References Cited

U.S. PATENT DOCUMENTS

| | | | |
|---|---|---|---|
| 3,305,755 | 2/1967 | Walsh | 323/271 |
| 3,543,130 | 11/1970 | Reijnders | 320/1 |
| 3,818,309 | 6/1974 | Ichikawa | 363/60 |

FOREIGN PATENT DOCUMENTS

| | | | |
|---|---|---|---|
| 2200660 | 7/1973 | Fed. Rep. of Germany | 320/1 |
| 2413915 | 10/1975 | Fed. Rep. of Germany | 320/1 |

*Primary Examiner*—Peter S. Wong
*Attorney, Agent, or Firm*—Dressler, Goldsmith, Shore, Sutker & Milnamow, Ltd.

[57] ABSTRACT

A pulse high frequency power supply includes a plurality of power supply branches connected between the input and the output of the supply. Each power supplying branch includes a capacitor which can be charged by a first silicon-controlled rectifier and subsequently discharged by a second silicon-controlled rectifier. A control circuit, which can include a microcomputer, generates sequences of pulses to charge each storage capacitor in each branch at a predetermined time and to discharge each charged capacitor thereby providing a plurality of temporally spaced-apart current pulses to the load.

36 Claims, 8 Drawing Sheets

HIGH FREQUENCY, HIGH POWER, POWER SUPPLY

FIELD OF THE INVENTION

The invention pertains to power supplies that provide high levels of output power. More particularly, the invention pertains to systems for providing high-current, variable-frequency output power with a high degree of reliability and with low energy losses.

BACKGROUND OF THE INVENTION

High-frequency power sources are used for many purposes in industry. These include high-frequency induction heating, melting, hardening, and quenching. Such power sources are also used in arc welders, resistive welders, and in platers that require pulsed current. Such power sources also find use as pulse current generators for anodization of metal surfaces.

Many known high-frequency power suppliers generate continuous current which has a waveform analogous to a simple sinusoidal wave. These known systems require high-power, high frequency thyristors. In operation, a great deal of heat is generated. As a result, they are prone to failure and low power efficiency.

There continues to be a need for high power, pulsed power supplies which are reliable and have a relatively high power efficiency. Preferably, such supplies will be relatively compact physically and not require high performance thyristors.

SUMMARY OF THE INVENTION

In accordance with the invention, a power supply is provided which uses a plurality of parallel coupled capacitor-thyristor pairs. The capacitor-thyristor pairs are each intended to contribute a portion of the output power delivered by the supply. As a result of dividing the provided output power among a plurality of capacitor-thyristor pairs, the reliability and efficiency of the power supply are increased.

A power supply in accordance with the invention is usable with an exterior source of electrical energy for the purpose of supplying energy to a load. The power supply includes at least one power supplying branch and a control unit. The power supplying branch includes a charging electrically controllable switch, such as a thyristor, which is electrically coupled to a capacitor. The branch also includes an electrically controllable discharging switch, such as a thyristor, which can be used to substantially discharge energy stored on the capacitor into the load.

The control unit alternately switches the charging switch on, to charge the capacitor from the source of electrical energy, and then switches the discharging switch on to dump the stored energy on the storage capacitor to the load. The cycle is then repeated.

In one embodiment of the invention, a plurality of branches, of the type described above, can be connected in parallel between the source of electrical energy and the load. The control unit repetitively charges and discharges each of the capacitors in a predetermined sequence thereby generating a pulsating current to the load.

The output power can be increased by increasing the number of branches in the supply. Alternately, the output power can be increased by increasing the frequency at which each of the capacitors, in each branch, is charged and then discharged. The output power can also be increased by increasing the capacitance of each of the storage capacitors.

In accordance with the invention, each capacitor is recharged almost immediately after it has been discharged. Each of the charged capacitors remains in a charged state until the associated discharge thyristor discharges the capacitor to the load.

Power supplies in accordance with the present invention possess a number of very desirable attributes. Since the total power provided to the load is split among the total number of branches, the design requirements imposed on each individual thyristor are less stringent than in alternate designs. As a result, since each thyristor handles only a fraction of the total power, the heat dissipation associated with each thyristor is very small. The reduced heat dissipation enhances the performance of the thyristor and contributes to the unit having a longer lifetime. In addition, reduced heat dissipation results in less of a cooling problem than is present in many conventional high powered designs.

Further, the actual conducting time associated with each discharged thyristor is short. This increases the power efficiency and further reduces heat losses. The relatively long interval between turning off and turning on each thyristor in the present power supply makes it possible to use thyristors which have longer turn off times.

Further, power supplies in accordance with the present invention are particularly advantageous in that by adjusting the discharging frequency rate, it is possible to precisely control the frequency and output power to the load.

In one disclosed embodiment of the invention, a computer is used to translate desired output power levels to required frequency rates for switching the thyristors on and off. If necessary, discrete pulses of current provided to the load can be counted for ultra precise control over the delivered power.

In another embodiment of the present invention, both positive going and negative going output current and voltage pulses can be provided to the load. Such an embodiment provides a load current without a d.c. component.

A method according to the present invention, of delivering electrical energy to a selected load includes the steps of:

(a) providing an energy storage device;
(b) storing energy in the device;
(c) discharging the stored energy to the load; and
(d) repeating steps (b) and (c) above.

The present invention has been described with respect to preferred embodiments. It will be clear to those skilled in the art that modifications and/or variations of the disclosed subject matter can be made without departing from the scope of the invention set forth herein.

DESCRIPTION OF THE DRAWINGS

The present invention will become fully understood from the detailed description given hereinbelow and the accompanying drawings which are given by way of illustration only, and thus are not a limitation of the present invention, and wherein.

DETAILED DESCRIPTION OF THE PREFERRED EMBODIMENTS

Figure 1:
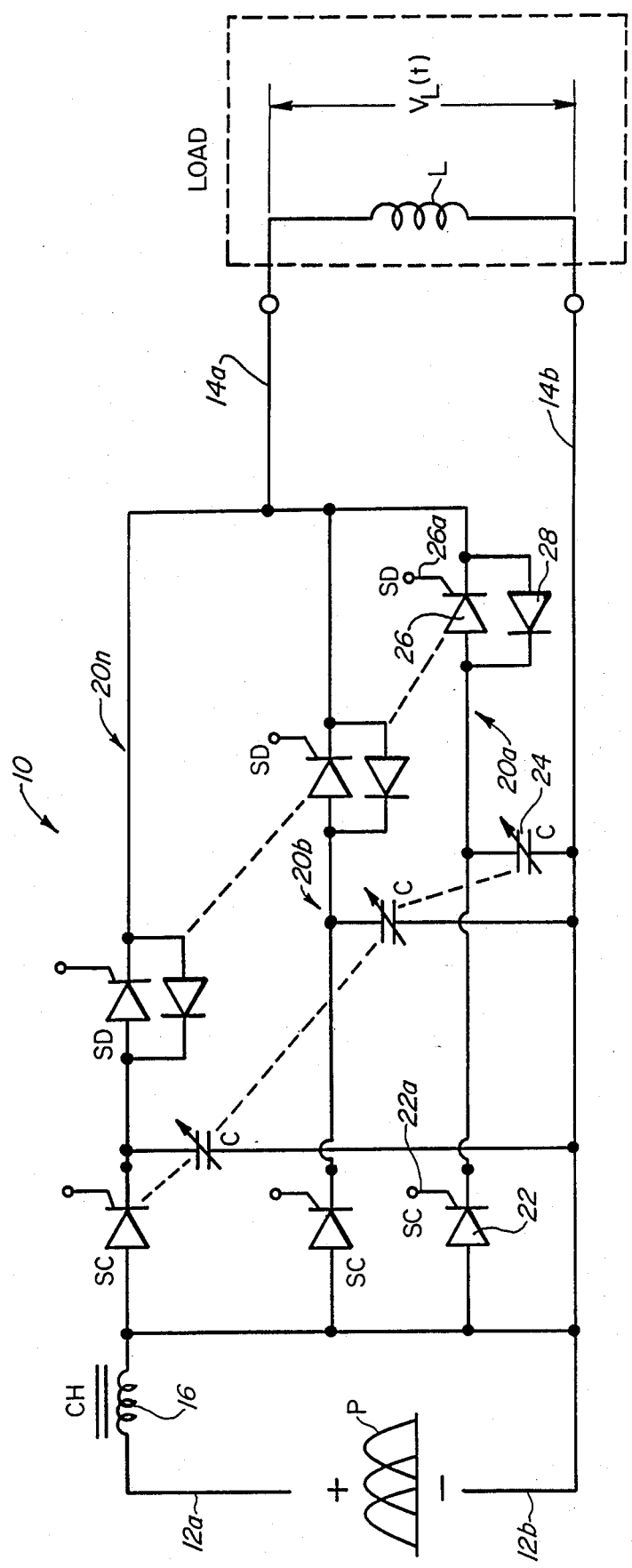
FIG. 1 is a schematic diagram of one embodiment of a power supply in accordance with the present invention.

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a power supply 10 in accordance with the present invention. The power supply 10 is usable with an exterior source of electrical power P, illustrated in the exemplary embodiment of FIG. 1 as rectified three phase alternating current and voltage. The power supply 10 is usable to controllably supply power, or electrical energy, to an inductive load L.

The power supply 10 includes an input power terminal pair 12a and 12b for receiving input power, or electrical energy, from the external supply P. The power supply also includes an output terminal pair 14a and 14b for coupling electrical power, or electrical energy, to the load L.

It will be understood that the load L is illustrated as an inductive load in the exemplary embodiment of FIG. 1. The power supply 10 is not limited to use with inductive loads.

A filter inductor 16 is coupled in series with the input terminal 12a.

The power supply 10 includes a plurality of power supply ranches 20a, 20b to 20n. The number of power supply branches is not a limitation of the present invention but is dictated by the output power requirements of the load L and the available input power supply P.

Each of the power supply branches 20a, 20b, to 20n is identical. Each of the power supply branches 20a, 20b up to 20n is coupled between the inductor 16 and the output terminal 14a. A discussion of branch 20a will also apply to each of the other branches, 20b to 20n.

The branch 20a includes a branch charging thyristor 22. The thyristor 22 has an anode which is coupled to the inductor 16. A cathode of the thyristor 22 is coupled to an energy storage capacitor 24.

The energy storage capacitor 24 can have either a fixed or a variable capacitance. The capacitor 24 is in turn coupled to a branch discharging thyristor 26. The cathode of the thyristor 22 is electrically connected to the anode of the thyristor 26. The cathode of the thyristor 26 is electrically connected to the output terminal 14a. A transient voltage suppression diode 28 is connected across the discharging thyristor 26.

In addition the diode 28 provides a reverse current path for reverse current from the load L when the thyristor 26 is turned off.

The charging thyristor 22 has a gate input 22a which can be used to switch the thyristor 22 from a non-conducting to a conducting state. Similarly, the thyristor 26 has a gate input 26a usable to switch the thyristor 26 from a non-conducting to a conducting state.

The thyristors in each of the power supply branches 20a through 20n, such as the thyristors 22 or 26 as will be understood by those with skill in the art could be silicon-controlled rectifiers. In addition, the energy storage device, the capacitor 24, in each of the branches 20a through 20n could be implemented as a capacitor with a fixed value of capacitance. Alternately, the energy storage device could be implemented as a capacitor with a variable capacitance.

The load element to which the supply 10 is supplying pulses of electrical energy through the terminals 14a and 14b can be any one of a variety of different devices. These include induction heaters, platers, arc welders, resistive welders, anodizers for metal surfaces or impact vibrators.

It will be understood that the exact load to which the supply 10 supplies electrical energy or power is not a limitation of the present invention.

Figure 2:
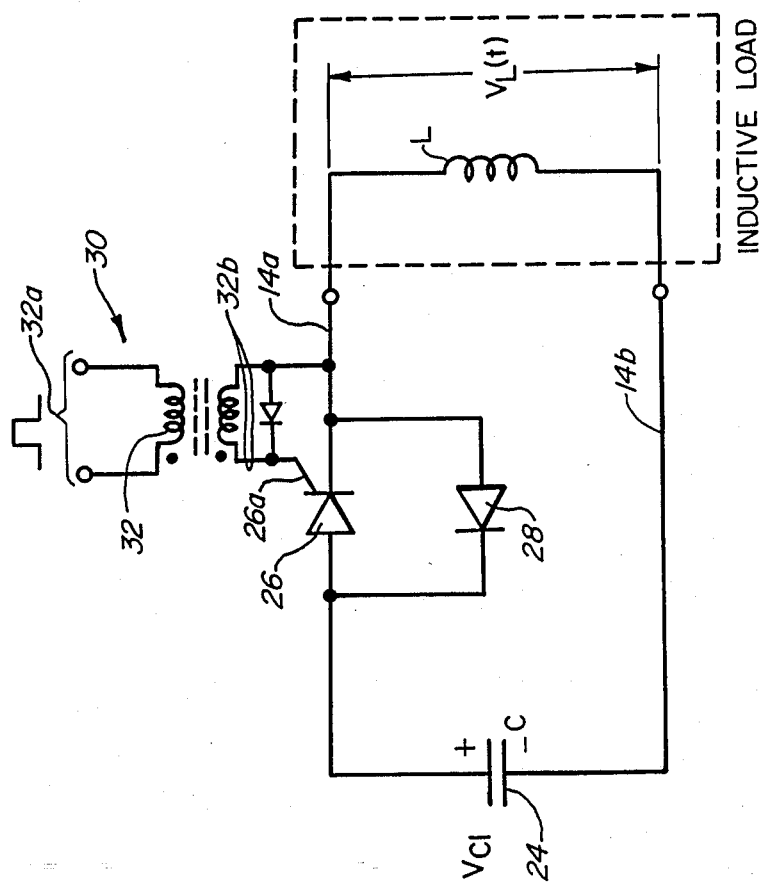
FIG. 2 is a schematic diagram of a discharging circuit in one branch of the power supply of FIG. 1.

FIG. 2 illustrates an exemplary trigger circuit 30 usable to switch the branch discharge element, such as the thyristor 26 from a non-conducting, to a conducting state. The trigger circuit 30 includes an isolation transformer 32 with a primary 32a to which a gate pulse can be applied. The transformer 32 includes a secondary 32b which is coupled between the gate input 26a of the thyristor 26 and the output power terminal 14a. A positive going gate trigger pulse on the input 32a will generate a gate trigger voltage at the control input 26a thereby driving the thyristor 26 into conduction.

When the thyristor 26 switches from its non-conducting to its conducting state, charge previously accumulated on the storage element 24 is discharged through the terminals 14a and 14b into the load L. After the electrical energy stored on the element 24 has been substantially discharged into the load L, the discharging switch 26 switches from its conducting state to its non-conducting state.

When the charging switching element in any branch, such as the branch 20a, is conducting, an LC circuit is formed with the inductor 16 and the respective storage device such as the capacitor 24. When the discharging switch element in any branch, such as the branch 20a, is conducting an LC circuit is formed with the respective storage device, such as the capacitor 24, and the load L. In each instance, the respective LC circuits exhibit the well-known oscillatory behavior of such circuits.

Figure 3:
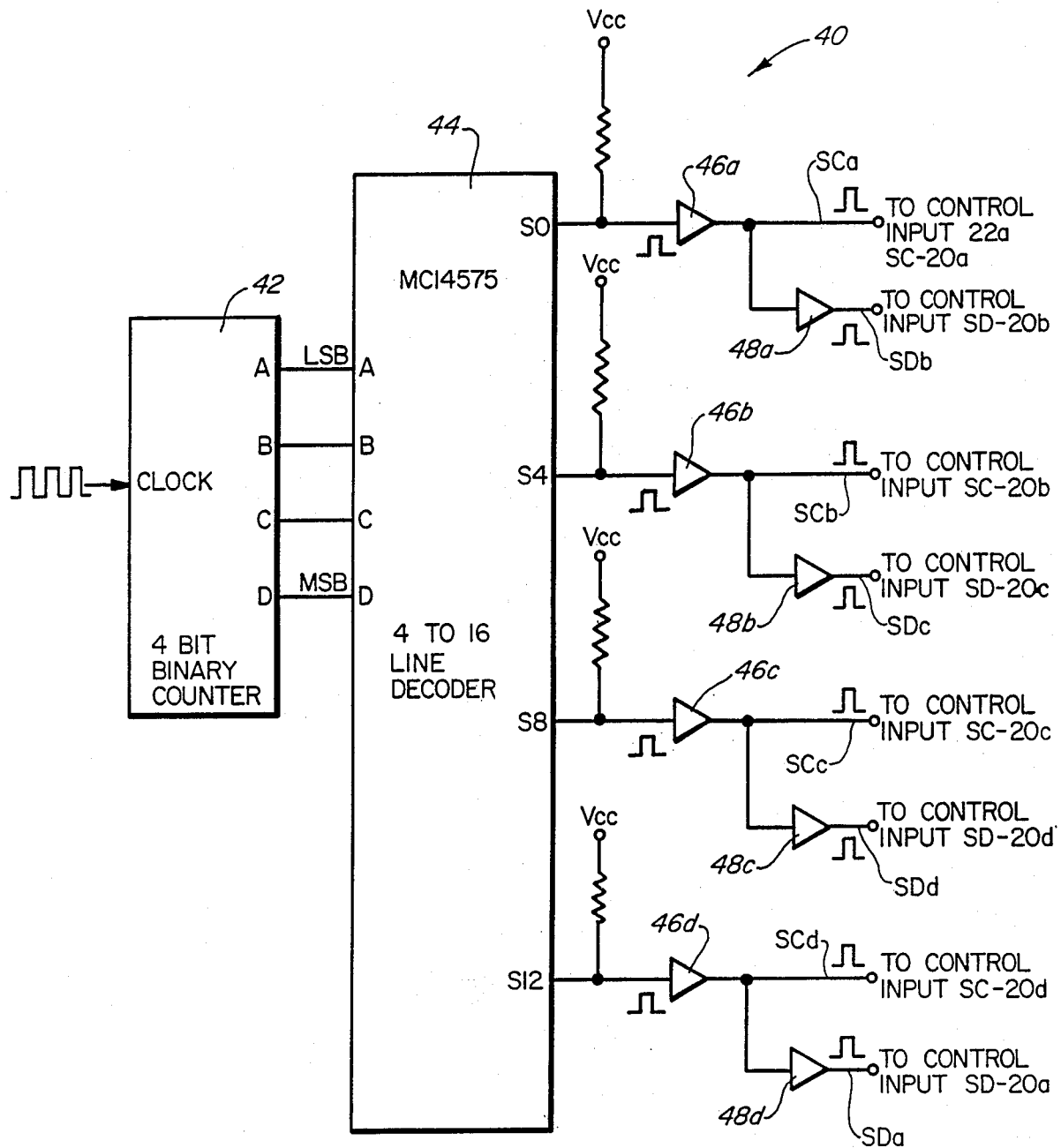
FIG. 3 is a schematic diagram of a logic circuit for generating charging and discharging gate pulses for use with the power supply of FIG. 1.

FIG. 3 is a schematic diagram of a control circuit 40 usable with a power supply, such as the power supply 10, which has four power supply branches. The four branches would correspond to branches 20a, 20b, 20c, and 20d. Each of the branches would have a structure corresponding to the detailed structure of the branch 20a previously discussed.

The control circuitry of FIG. 3 includes a four bit binary counter 42 which receives clock pulses from a source. The four bit output of the binary counter 42 is coupled to four inputs of a four to sixteen line decoder 44. The four to sixteen line decoder 44 could be a type MC 14575 integrated circuit.

Outputs from the decoder 44 on four lines s0, s4, s8, and s12 are used to generate a plurality of inputs to the control gates to the charging switching elements, such as the element 22 and discharging switching elements, such as the element 26, of each of the branches 20a, 20b, 20c, 20d. Each of the selected output pulses s0, s4, s8 and s12 is coupled, via a non-inverting amplifier or buffer 46a, 46b, 46c and 46d to a corresponding control input of a charging switching element in a respective branch.

For example, a buffer 46a is coupled to gate input 22a of charging switching element 22. The output of the buffer 46b is coupled to the gate input of the charging switching element of the branch 20b. Similarly, the outputs of buffers 46c and 46d are coupled to gate inputs corresponding charging switches of branches 20c and 20d.

Each of the buffers 46a through 46d is also coupled to a non-inverting buffer 48a through 48d. Each of the buffers 48a through 48d introduces a slight delay on the order of 50 to 100 nanoseconds into the output pulse with respect to the input pulse thereto from the buffer 46a. Output from each of the buffers 48a to 48d is coupled to a control input of a corresponding branch discharge thyristor.

For example, the output of the buffer 48a is coupled to the control gate 26a of the discharge thyristor 26 of the branch 20b. Similarly, outputs from the buffers 48b, 48c, and 48d are coupled to corresponding gate inputs to each of the discharge switching elements of the branches 20c, 20d, and 20a.

It will be understood that the control unit 40 of FIG. 3 is provided for illustrative purposes only and is not a limitation of the power supply of the present invention.

Figure 4:
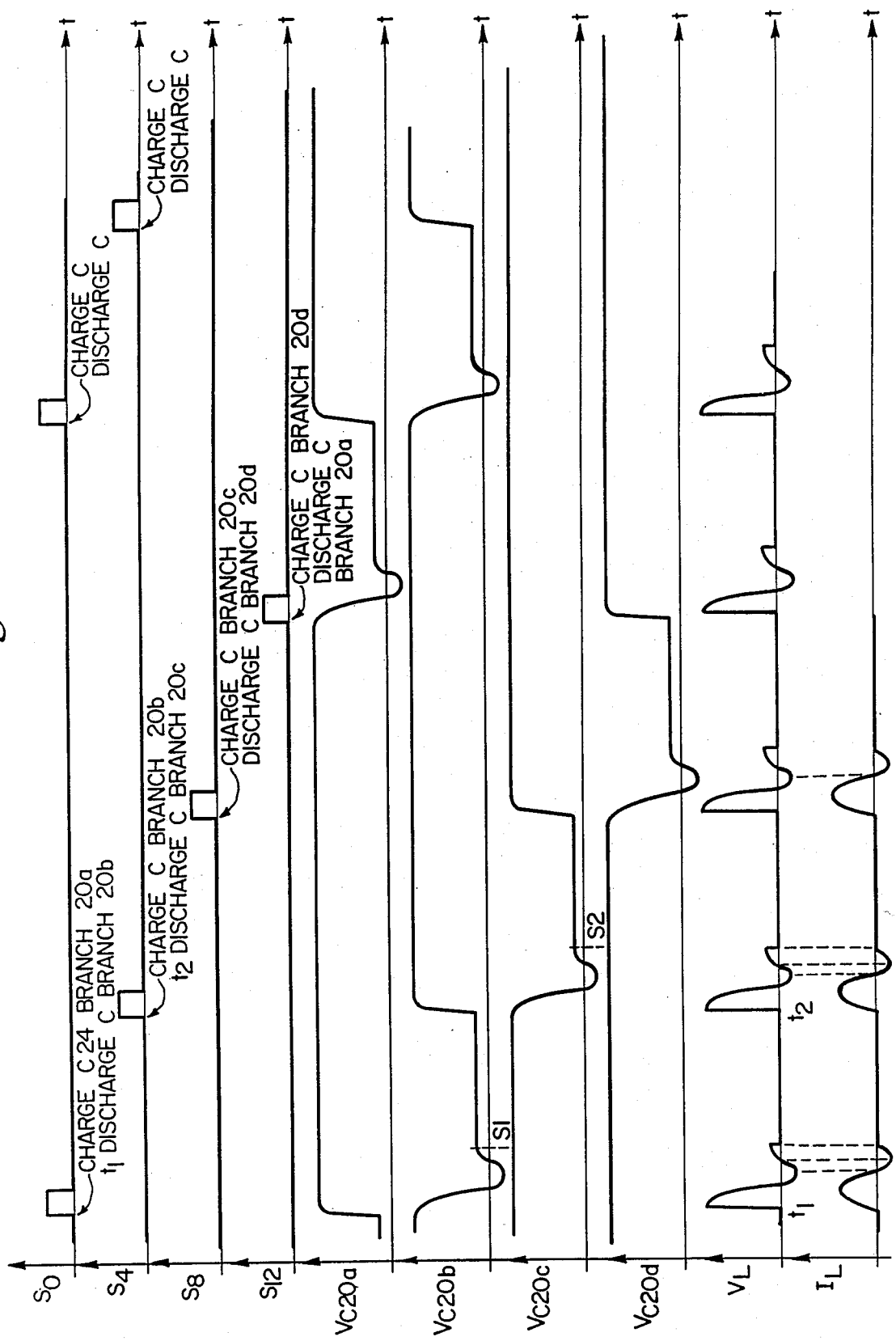
FIG. 4 is a set of waveforms, as a function of time, illustrating the operation of the power supply of FIG. 1.

FIG. 4 illustrates a plurality of wave forms as function of time illustrating the operation of the power supply 10 in combination with the control unit 40. The top four graphs of FIG. 4 illustrate the pulses s0 through s12 as a function of time. As described previously with respect to the control unit 40, each of the pulses s0 through s12 has a dual function.

Following the graphs of the pulses s0 through s12 on FIG. 4 are graphs of the voltage Vc across each of the capacitors C in each of the branches 20a, 20b, 20c and 20d as a function of time. The capacitor voltages illustrated in FIG. 4 are in response to the applied charging and discharging pulses generated by the buffers 40a through 46d as well as the buffers 48a through 48d.

For example, at time t1 on the rising edge of the pulse s0 output from the buffer 46a switches the thyristor 22 into a conducting state thereby charging the storage element, capacitor 24 in the branch 20a. A short period of time later, corresponding to the delay of the gate 48a, the discharge element in the branch 20b, corresponding to the element 26 of the branch 20a, is switched to a conducting state thereby discharging the electrical energy stored in the respective storage element of the branch 20b, via the terminals 14a and 14b to the load 1.

At a time s1, which corresponds to one natural oscillatory period of the output of the inductor-capacitor circuit represented by the branch 20b and the load L, the input signal to the discharging element of the branch 20a will have been removed and that thyristor becomes reverse biased and switches from its conducting state to its non-conducting state. A relatively low residual voltage remains on the corresponding storage capacitor until the next control pulse, s4 is generated at a time t2.

At the time t2, the charging element of the branch 20b receives a gate control signal via the buffer 46b which switches that thyristor from its non-conducting to its conducting state thereby recharging the corresponding capacitor. One gate delay later, corresponding to the signal output from the gate 48b, the discharging switching element of the branch 20c receives a control pulse switching it from a non-conducting to a conducting state thereby discharging a pulse of current from the corresponding storage capacitor to the load 1.

Later, at a time s2 which also corresponds to one natural oscillatory period of the corresponding inductor-capacitor circuit, the discharging switching element for the branch 20c becomes reversed biased and switches from a conducting state to a non-conducting state.

The bottom two graphs in FIG. 4 are representations of the load voltage generated across the terminals 14a and 14b by the power supply 10 and the corresponding load current generated by the supply 10. As is apparent from the graphs on FIG. 4, the load voltage and the load current are both asymmetrical and have a d.c. component.

When the load current $I_L$ reverses, the thyristor which has been conducting starts to turn off. The reverse portion of the load current $I_L$ flows through the corresponding paralled connected diode, such as the diode 28. When the reverse load current $I_L$ goes to zero, the diode, such as the diode 28, stops conducting.

The time interval between the pulse at the time t2 and the pulse at the time t1 is the period of the output voltage of the power supply 10. This period which determines overall system performance can be readily adjusted by altering the period of the control pulses s0 through s12.

In the control unit of FIG. 3 the period of the pulses s0 through s12 can be altered by changing the input frequency to the four bit binary counter 42. It will be understood that a variety of control units for generating the necessary control pulses can be used with the power supply 10. The exact control unit used is not a limitation of the present invention.

Figure 5:
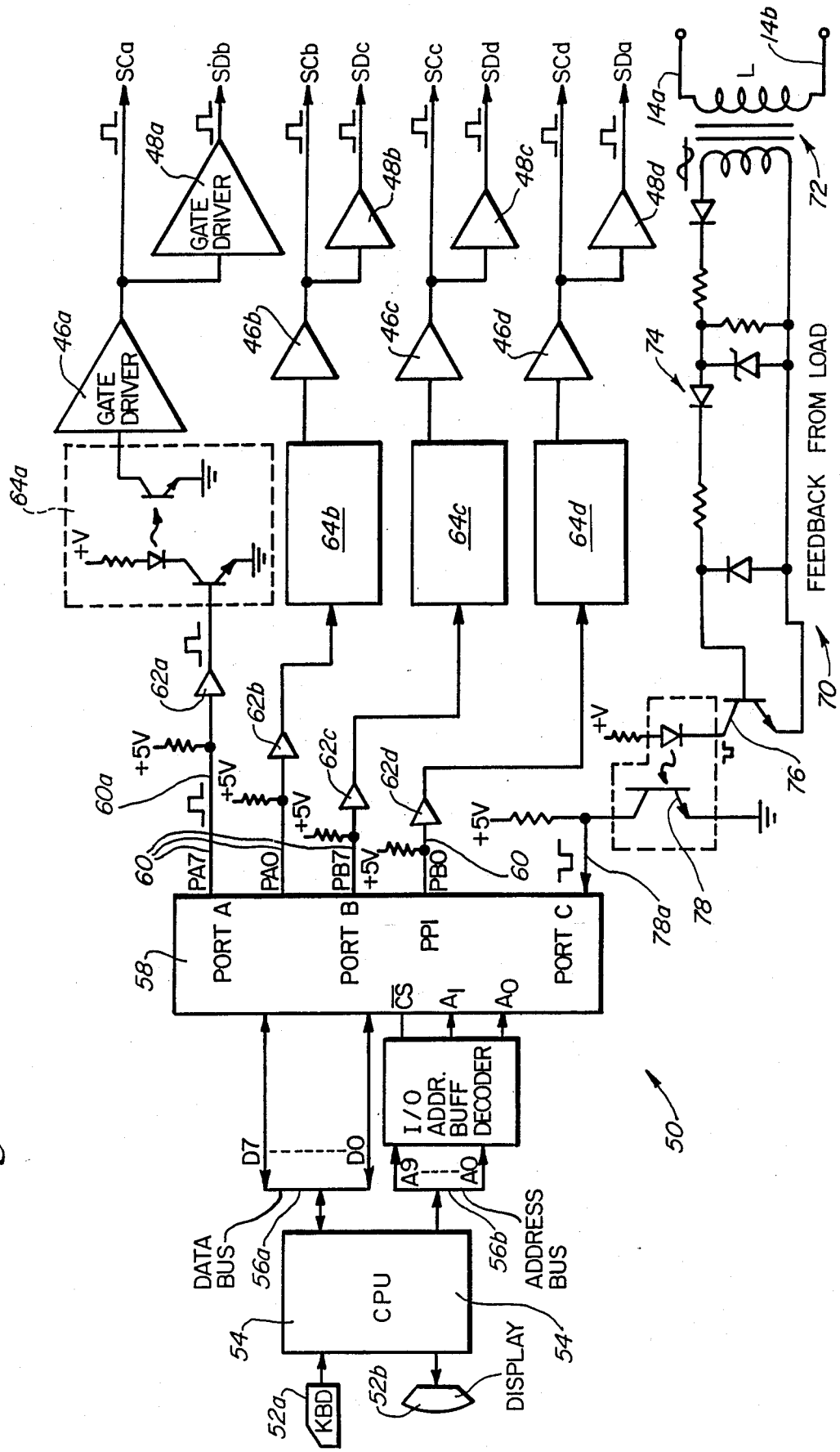
FIG. 5 is a block diagram schematic of a programmed control unit usable with the power supply of FIG. 1.

FIG. 5 illustrates an overall schematic block diagram of a computer based control unit 50. The control unit 50 includes operator input/output devices such as a keyboard 52a and a display 52b. The keyboard and display 52a and 52b are coupled to a central processing unit 54.

The central processing unit can be any one of a variety of commercially available microprocessors. For example, the Intel 8088 or the Intel 80286 or 80386 processors could be used. As is well known, such processors have a data bus 56a and an address bus 56b utilizable for communicating with both storage units as well as input/output devices.

One particular input/output device is a programmable peripheral interface 58. For example the programmable peripheral interface 58 could correspond to an Intel 8255 interface.

Data signals from the data bus 56a can be transferred to or from the programmable peripheral interface 58 utilizing the address bus 56b. Outputs from the peripheral interface 58 via Port A or Port B on a plurality of selected output lines 60 can be used to generate pulses corresponding to the pulses s0 through s12 previously discussed.

Output signals on the plurality of lines 60, such as the exemplary line 60a can be passed through a noninverting buffer 62a and transferred to an optical isolating device 64a. Output from the optical isolating device 64a via the noninverting amplifier 46a can be coupled to the gate input of the charging switching element of the branch 20a as previously discussed. Similarly, outputs from the noninverting amplifier buffer 46a via the amplifier buffer 48a provide a gate control signal to the discharging switching element of the branch 20b as previously discussed.

The remaining control pulses, corresponding to the pulses s4, s8 and s12 previously discussed can be implemented using the computer based control unit 50 and noninverting buffers 62b, 62c and 62d in combination with optical isolating elements 64b, 64c and 64d as illustrated in FIG. 5.

The control unit 50 in combination with the power supply 10 will generate a set of wave forms corresponding to those of FIG. 4. In conjunction with the control unit 50, however, an operator will be able to enter an average desired output power as well as any other required parameters. The processor 54 can convert the desired average output power to the necessary plurality of pulses, at an appropriate frequency, so as to cause the power supply 10 to correctly deliver the desired level of average output power.

The control unit 50 can also include feedback circuitry 70. The circuitry 70 provides feedback concerning the number of pulses actually delivered to the load. Feedback signals are generated in the circuit 70 by means of a transformer 72 which provides for slight coupling to the load L. Output from the transformer 72, a somewhat sinusoidal pulse can be rectified and clamped in signal processing circuitry 74.

Output signals from the circuitry 74, at a transistor 76, can be used to drive an optical isolator 78 for the purpose of providing an isolated down-going control signal on the line 78a to the peripheral interface unit 58. The pulses on the line 78a correspond to pulses of power delivered to the load by the power supply 10. Hence, the control unit 50 can very precisely regulate the power being supplied to the load even down to the level of counting the current pulses that have been supplied.

Figure 6:
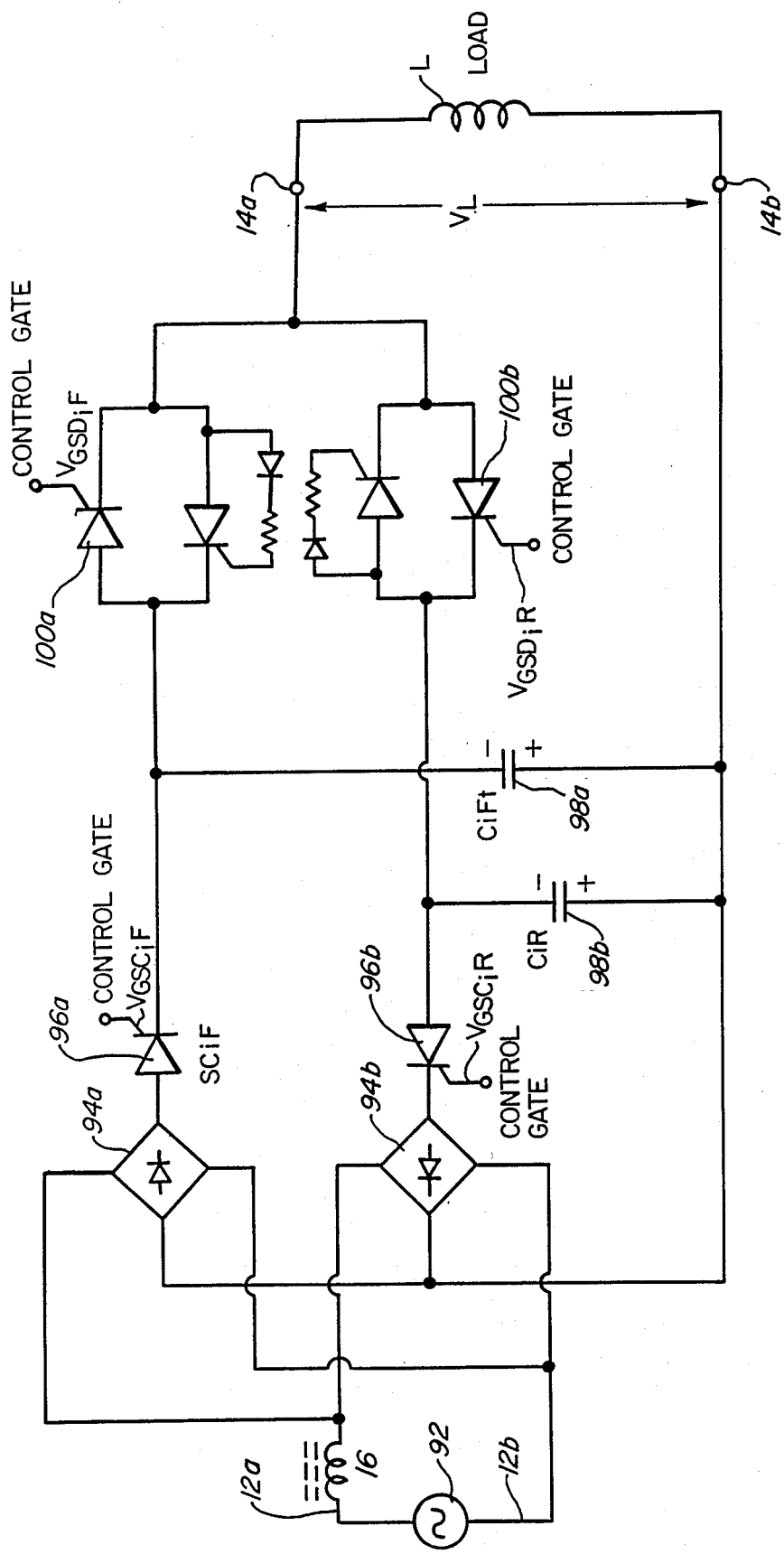
FIG. 6 is a schematic diagram of an alternate embodiment of the power supply of FIG. 1.

FIG. 6 illustrates an alternative embodiment 90 to the power supply 10. The embodiment 90 provides symmetrical output voltage and current way forms with respect to the terminals 14a and 14b. Hence, the load L is not subjected to a d.c. component when the supply 90 is used.

The supply 90 receives input energy from an alternating source 92 coupled across terminals 12a and 12b. Input from the supply 92 is rectified in rectifiers 94a and 94b.

Output from the rectifier 94a provides a positive going signal to a charging switching element 96a. Output from the rectifier 94b provides a negative going signal to a charging switching element 96b. The elements 96a and 96b are coupled to an energy storage element, such as capacitors 98a and 98b.

Energy stored on the capacitors 98a and 98b, having alternately a positive and a negative polarity associated therewith, can be discharged to the load L by means of a positive discharge switching element 100a and a negative discharge switching element 100b. The elements 100a and 100b can also be implemented as thyristors. As illustrated in FIG. 6 the reverse diodes, corresponding to the diode 28, can be implemented as thyristors.

In accordance with the previous discussion, the supply 90 can be coupled with a control unit which sequentially switches the charging element 96a from a nonconducting to a conducting state to charge the storage element 98a and then discharges the storage element 98a by means of the discharging switching element 100a. Subsequently, the control unit can switch the negative charging switching element 96b to a conducting state thereby charging the storage element 98b with a negative going voltage. The energy stored on the element 98b, with a reverse polarity, can then be discharged subsequently into the load L by means of the negative discharge switching element 100b.

Figure 7:
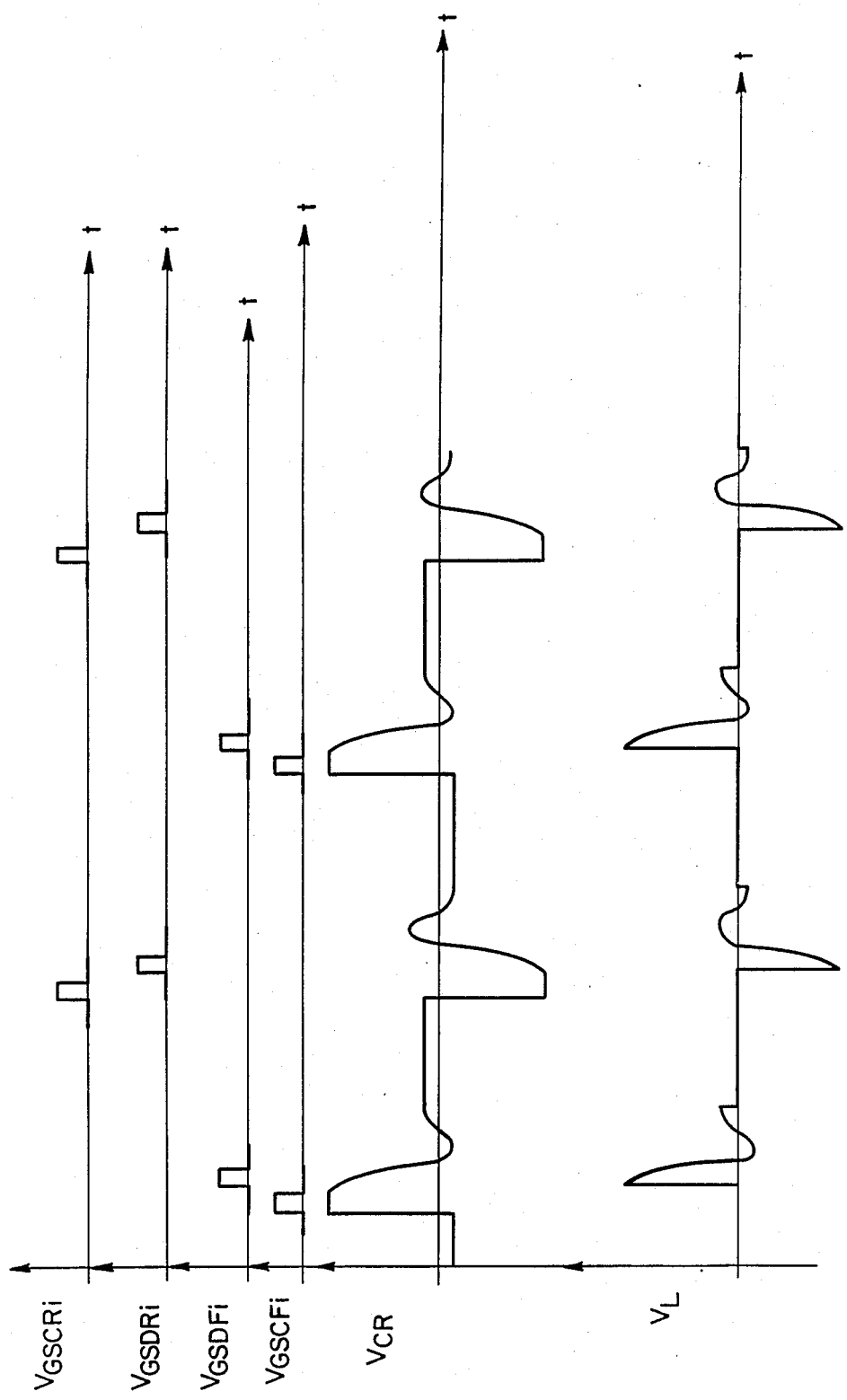
FIG. 7 is a set of waveforms, as a function, of time, illustrating the operation of the power supply of FIG. 6.

FIG. 7 illustrates a plurality of wave forms associated with the operation of the power supply 90.

It will be understood that the power supply 90 as illustrated in FIG. 6 has only a single branch, branch i. The supply 90 could be readily extended to a power supply having a plurality of branches as in the case of the power supply 10.

Figure 8:
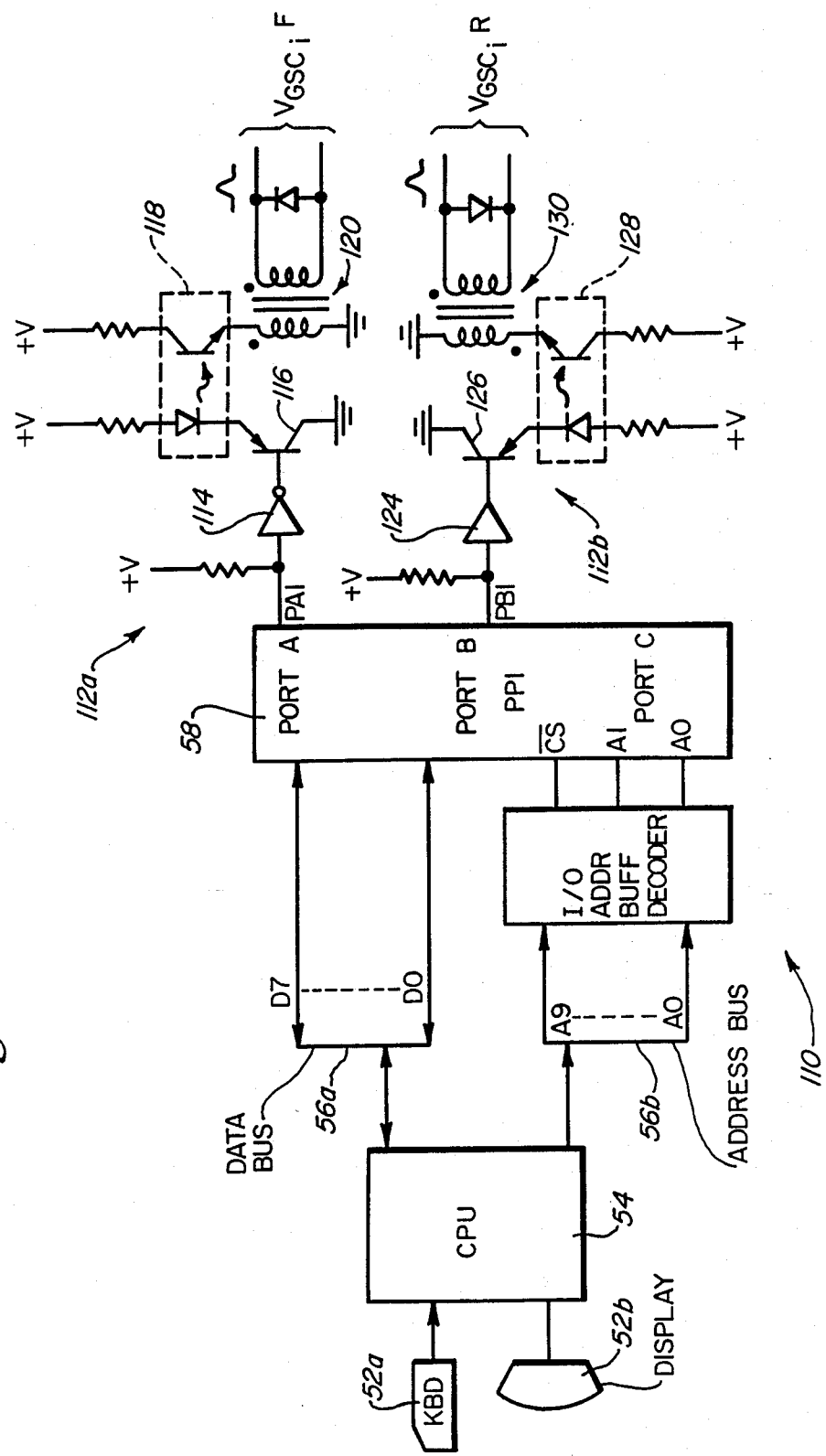
FIG. 8 is a programmed control unit usable with the power supply of FIG. 6.

FIG. 8 illustrates a control unit 110 usable with the power supply 90. The control unit 110 includes a programmed processor 54 of the type previously discussed. The processor 54 can again include a keyboard 52a and a display 52b for operator inputs and outputs.

The processor 54 communicates with the programmable peripheral interface circuit 58 as previously discussed. Outputs from lines PA1 and PB1 are coupled respectively to gate driver circuits 112a and 112b.

Gate driver circuit 112a includes an inverting buffer driver 114 which provides signals to a transistor 116. Output from the transistor 116 is coupled via an optical isolator 118 to the primary of a transformer 120. Output from the transformer 120 provides forward gate drive to the gate input of the forward charging switching element 96a.

Drive circuit 112b couples outputs from the interface output line PB1 via a noninverting buffer 124 to a transistor 126. Output from the transistor 126 is in turn coupled, via an optical isolator 128 to the primary of a transformer 130. Pulses from the secondary of the transformer 130 provide gate input drive to the reverse charging switching element 96b.

When outputs on the lines PA1 and PB1 are both high, the forward charging switching element 96a starts to conduct. When outputs on the lines PA1 and PB1 are both low, the reverse charging switching element 96b starts to conduct.

Hence, by controlling the signals on the lines PA1 and PB1, the capacitors 98a and 98b can be alternately charged with electrical energy having appropriate polarities. Similar circuitry can be used to provide gate input signals to the forward and reverse discharge switching elements 100a and 100b.

While the illustrated output current and voltage of the supply 90 in FIG. 7 is symmetrical and does not include a d.c. component, it will be understood that by altering the parameters of the branch is supply 90 a variety of different wave forms can be generated thereby. It will be understood that all such variations and modifications of component values, frequencies of operation or the like come within the spirit and scope of the present invention.

With respect to the power supply 10 in FIG. 1, it has been found that advantageous results can be obtained when the period of the output voltage pulses is on the order of one millisecond (corresponding to a frequency on the order of 1,000 hertz). With such a period and frequency, the supply 10 can be operated with current flowing to the load L in the terminals 14a and 14b up to 80 to 95 percent of the one millisecond period.

Alternately, the time interval of current flow per pulse between the terminals 14a and 14b to the load L can be set at one millisecond between the start of discharge and when the corresponding discharging semiconductor element begins to turn off. In this mode of operation, the input pulse clock rate can then be varied in a range from 1 hertz to 950 hertz depending on the desired average power to be delivered to the load.

Again, with respect to the power supply 10 of FIG. 1, a four branch embodiment of the supply 10 has been implemented to supply 1 kilowatt of output power to the load L. In that embodiment, each of the four storage capacitors has a capacitance of 14 microfarads. The input source of a.c. power required was 100 volts rms, single phase 60 hertz. Such a prototype has been found to be operable with an output pulse frequency in a range of 1,000 to 3,000 hertz.

Much higher capacity power supplies, corresponding to the supply 10, are also possible. For example, a 100 kilowatt supply could be implemented using a 600 to 800 volt a.c. input source. Such a supply would require storage capacitors on the order of 100 microfeads at 800 volts. The output frequency range for such a supply would also be on the order of 1,000 through 3,000 hertz.

It will be understood that instead of using a voltage source to store energy on one or more capacitors, analogously, a current source could be used to store energy in one or more inductors. Using one or more inductors as storage elements does not depart from the spirit and scope of the invention.

It will be understood that the load L can be the primary of a transformer. The secondary of the transformer can be coupled to a resistive load. Such an arrangement provides for driving a resistive load with an inductive element available to the LC circuitry of the power supply.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A multi-branch power supply usable with an exterior source of electrical energy for supplying energy, substantially without a dc component to a load comprising:

a first power supplying branch with,
first branch charging means having a first state and a second state;
first means, coupled to said first branch charging means, for storing, with a first polarity, energy received from the source of electrical energy when said first charging means is in said first state;
first branch discharging means having a first state and a second state and coupled between said first storage means and the load for providing energy stored with said first polarity at said first storage means to the load when said first branch discharging means is in said first state;

a second power supplying branch with,
second branch charging means having a first state and a second state;
second means, coupled to said second branch charging means, for storing, with a second polarity, energy received from the source of electrical energy when said second charging means is in said first state;
second branch discharging means having a first state and a second state and coupled between said second storage means and the load for providing energy stored with said second polarity at said second storage means to the load when said second branch discharging means is in said first state; and control means, coupled to said first branch charging and discharging means, for switching said first charging means to said first state, with said first discharging means in said second state, to store energy at said first storage means with said first polarity during a first time interval and including means for subsequently switching, during a second time interval, said first discharging means to said first state, with said charging means in said second state, to transfer a substantial portion of the stored energy from said first storage means to the load with said first polarity during said second time interval with said first time interval preceding said second time interval including means, coupled to said second branch charging and discharging means, for switching said second charging means to said first state, with said second discharging means in said second state to store energy at said second storage means with said second polarity during a third time interval and including means for subsequently switching, during a fourth time interval, said second discharging means to said first state, with said second charging means in said second state, to transfer a substantial portion of the stored energy from said second storage means to the load with said second polarity during said fourth time interval with said third time interval preceding said fourth time interval.

2. A power supply as in claim 1 with said first and second branches coupled in parallel between the exterior source and the load.

3. A power supply as in claim 1 with each said storing means each including a capacitor.

4. A power supply as in claim 1 with said first charging means including switching means.

5. A power supply as in claim 4 with said switching means including at least one solid state switching element having a power input terminal, a power output terminal and a control input terminal.

6. A power supply as in claim 5 with said switching element a silicon controlled rectifier.

7. A power supply as in claim 1 with said control means including a programmed computer.

8. A power supply usable with an exterior supply of electrical power for supplying controlled, pulsed, quantities of electrical power to a load having an inductive component comprising:

an input power terminal means for receiving input power from the exterior supply;
an output power terminal for delivering output power to the load;
a plurality of power supply branches, coupled, in parallel, between said input terminal means and said output terminal with each of said branches including:
a branch charging means having a first state and a second state;
means, coupled to said branch charging means, for storing energy received from the source of electrical energy when said charging means is in said first state;

branch discharging means having a first state and a second state and coupled between said storage means and said output power terminal for providing energy stored at said storage means, in the form of a current pulse, to the load when said branch discharging means is in said first state;

control means, coupled to each of said branch changing means and to each of said branch discharging means, for sequentially switching each said branch charging means to said respective first state to store energy in each said respective storing means with some of said storing means being changed at different times than others of said storing means and for sequentially switching each said branch discharging means to a said respective first state to provide energy stored in said storing means to said output power terminal and including means for forming a sequence of load current pulses at said output terminal from said energy stored at said plurality of storing means with each said branch discharging means including means for switching from a respective said first state to a respective said second state in response to a corresponding one of said load current pulses reversing direction.

9. A power supply as in claim 8 with each said branch changing means including solid state switching means.

10. A power supply as in claim 9 with each said solid state switching means including a power input terminal, a source output terminal and a control input terminal.

11. A power supply as in claim 8 with each said branch discharging means including solid state switching means.

12. A power supply as in claim 11 with each said solid state switching means including a power input terminal, a power output terminal and a control input terminal.

13. A power supply as in claim 8 with said energy storing means including a capacitor.

14. A power supply as in claim 8 with said energy storing means including an inductor.

15. A power supply as in claim 13 with said capacitor having a fixed value of capacitance.

16. A power supply as in claim 13 with said capacitor having a variable value of capacitance.

17. A power supply as in claim 8 with said control means including means for switching said branch changing means from said first state to said second state at a predetermined frequency.

18. A power supply as in claim 17 including means for varying said frequency in accordance with the power requirements of the load.

19. A power supply as in claim 8 including in each said branch discharging means, rectification means coupled thereacross.

20. A power supply as in claim 19 with each said rectification means including a diode.

21. A power supply as in claim 19 with each said branch discharging means including a thyristor.

22. A power supply as in claim 8 with said input power terminal means including an input power terminal coupled to an inductor.

23. A method of supplying electrical energy to a load comprising the steps of:
(a) supplying a plurality of energy storage devices;
(b) providing an average desired output power;
(c) converting the desired output power to a selected output pulse frequency;
(d) sequentially storing energy in each device;
(e) sequentially discharging substantially all of the energy stored in each device to the load; and
(f) repeating steps (d) and (e) above in accordance with the selected output pulse frequency.

24. A method as in claim 23 including storing energy in a selected device at about the same time as discharging another selected device.

25. A method as in claim 23 including storing energy in a selected device a predetermined period of time before discharging another selected device.

26. A method of supplying electrical energy to an inductive load comprising the steps of:
(a) supplying at least one energy storage device;
(b) storing energy in the device;
(c) providing an output current and voltage pulse to the inductive load by discharging substantially all of the stored energy thereto and detecting a reversal of voltage polarity at the load; and
(d) repeating steps (b) and (c) above.

27. A method as in claim 26 including repeating steps (b) and (c) at a selected rate thereby providing temporally spaced-apart current pulses to the load.

28. A power supply couplable to a source of electrical energy for delivery of pulsed energy to a load having an inductive component, the supply comprising:
an input terminal;
a plurality of parallel energy supplying branches coupled between said terminal and the load with each said branch including,
capacitive energy storing means;
first switching means coupled between said input inductor and said capacitive storage means;
second switching means coupled between said capacitive storing means and said inductive load;
means, coupled to said first and second switching means of each said branch, for repetitively controlling same including initially causing a respective one of said first switching means to conduct enabling a storing current to flow between said input terminal and a corresponding one of said storing means thereby storing energy of a first polarity thereon and for subsequently causing a respective one of said second switching means to conduct enabling an output current pulse of a first polarity to flow between said storing means and the load at a selected voltage polarity, substantially discharging said storing means, until said output voltage reverses polarity thereby providing a sequence of current pulses to the load.

29. A power supply as in claim 28 for delivery of pulsed energy, having substantially no dc component, to the inductive load including:
a second plurality of parallel energy supplying branches coupled between said terminal and the load with each of said branches including,
second capacitive energy storing means;
third switching means coupled between said input inductor and said second capacitive storage means;
fourth switching means between said second capacitive storage means and said inductive load;
said control means coupled to said third and fourth switching means of each said second plurality branch for repetitively causing same to conduct including further means for initially causing a respective one of said third switching means to conduct enabling a second storing current to flow between said input terminal and a corresponding one of said second storing means for storing energy of a second polarity thereon and for subsequently causing a respective one of said fourth switching means to conduct enabling an output current pulse of a second polarity to flow between said corresponding second storing means and the load with a second selected output voltage polarity, substantially discharging said corresponding second storing means, until said second output voltage reverses polarity thereby providing a second sequence of current pulses, displaced in time from said sequence, to the load with said two sequences of pulses, when taken together, having substantially no dc component.

30. A power supply as in claim 28 with rectifier means coupled in parallel across said second switching means.

31. A power supply as in claim 29 including rectifier means coupled in parallel across said fourth switching means.

32. A multi-branch power supply usable with an exterior source of electrical energy for supplying energy to an inductive load comprising:
at least one first power supplying branch with,
first branch charging means having a first state and a second state;
first capacitive means, coupled to said first branch charging means, for storing energy received from the source of electrical energy when said charging means is in said first state;
first branch discharging means having a first state and a second state and coupled between said storage means and the load for providing energy stored at said capacitive storage means to the load when said first branch discharging means is in said first state; and
control means, coupled to said first branch charging and discharging means, for switching said charging means to said first state, with said discharging means in said second state, to store energy at said storage means during a first time interval and including means, during a second time interval, for subsequently switching said discharging means to said first state, with said charging means in said second state, to transfer a substantial portion of the stored energy from said first storage means to the load during said second time interval with said first time interval preceding said second time interval and with said capacitive storage means forming an inductive-capacitive circuit with the load when said first branch discharging means is in said first state and with said first branch discharging means including means for switching said discharging means from said first state to said second state in response to becoming reverse biased.

33. A power supply as in claim 32 with said first charging means including switching means.

34. A power supply as in claim 33 with said switching means including at least one solid state switching element having a power input terminal, a power output terminal and a control input terminal.

35. A power supply as in claim 34 with said switching element a silicon controlled rectifier.

36. A power supply as in claim 32 with said control means including means for counting the number of control pulses delivered to the load.

* * * * *